(12) United States Patent
Guo et al.

(10) Patent No.: US 9,036,530 B2
(45) Date of Patent: May 19, 2015

(54) METHOD AND DEVICE FOR CARRYING MBMS NOTIFICATION INFORMATION

(75) Inventors: Wei Guo, Shenzhen (CN); Zijiang Ma, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 348 days.

(21) Appl. No.: 13/391,478

(22) PCT Filed: May 25, 2010

(86) PCT No.: PCT/CN2010/073238
§ 371 (c)(1),
(2), (4) Date: Feb. 21, 2012

(87) PCT Pub. No.: WO2011/006397
PCT Pub. Date: Jan. 20, 2011

(65) Prior Publication Data

US 2012/0195251 A1   Aug. 2, 2012
US 2013/0294315 A2   Nov. 7, 2013

(30) Foreign Application Priority Data

Jul. 13, 2009   (CN) .......................... 2009 1 0088278

(51) Int. Cl.
*H04H 20/71*   (2008.01)
*H04L 12/18*   (2006.01)
(Continued)

(52) U.S. Cl.
CPC ............... *H04L 12/189* (2013.01); *H04W 4/06* (2013.01); *H04W 52/0216* (2013.01); *H04W 68/00* (2013.01); *Y02B 60/50* (2013.01)

(58) Field of Classification Search
CPC ...... H04B 7/2681; H04B 7/0656; H04Q 7/22; H04W 4/06
See application file for complete search history.

(56) References Cited

U.S. PATENT DOCUMENTS 8,077,649 B2   12/2011   Cai
2005/0213583 A1*   9/2005   Lee et al. ................... 370/395.5
(Continued)

FOREIGN PATENT DOCUMENTS

CN   1998164 A   7/2007
CN   101433100 A   5/2009
(Continued)

OTHER PUBLICATIONS

International Search Report for PCT/CN2010/073238, English translation attached to original, Both Completed by the Chinese Patent Office on Aug. 3, 2010, All together 8 Pages.

*Primary Examiner* — Anez Ebrahim
(74) *Attorney, Agent, or Firm* — Brooks Kushman P.C.

(57) ABSTRACT

A method for carrying MBMS notification information comprising: when the MBMS notification information is transmitted more than once in a modification period of MCCH information, carrying at least once the MBMS notification information in a sub-frame carrying the MCCH information at the time of arrival of the modification period of the MCCH information; and when the MBMS notification information is transmitted once in the modification period of the MCCH information, carrying the MBMS notification information in the sub-frame carrying the MCCH information at the time of arrival of the modification period of the MCCH information. Also disclosed is a device for carrying MBMS notification information. The method for carrying MBMS notification information allows a receiving terminal to save more power.

14 Claims, 1 Drawing Sheet

(51) Int. Cl.
*H04W 52/02* (2009.01)
*H04W 4/06* (2009.01)
*H04W 68/00* (2009.01)

(56) References Cited

U.S. PATENT DOCUMENTS

| | | | |
|---|---|---|---|
| 2006/0040655 A1* | 2/2006 | Kim | 455/426.1 |
| 2009/0201854 A1 | 8/2009 | Roger | |
| 2009/0213769 A1* | 8/2009 | Shen et al. | 370/280 |
| 2009/0245188 A1* | 10/2009 | Fukuoka et al. | 370/329 |
| 2009/0286468 A1* | 11/2009 | Kim et al. | 455/3.03 |
| 2009/0303912 A1 | 12/2009 | Bourdeaut et al. | |
| 2010/0272004 A1* | 10/2010 | Maeda et al. | 370/312 |

FOREIGN PATENT DOCUMENTS

| | | |
|---|---|---|
| WO | 2007088311 A1 | 8/2007 |
| WO | 2009033252 A1 | 3/2009 |

* cited by examiner

METHOD AND DEVICE FOR CARRYING MBMS NOTIFICATION INFORMATION

CROSS-REFERENCE TO RELATED APPLICATION

This application is the U.S. national phase of PCT Appln. No. PCT/CN2010/073238 filed May 25, 2010 which claims priority to Chinese Application No. 200910088278.8 filed Jul. 13, 2009, the disclosures of which are incorporated in their entirety by reference herein.

TECHNICAL FIELD

The present invention relates to a Multicast Control Channel (MCCH) information update indication information technology, and in particular, to a method and device for carrying Multimedia Broadcast Multicast Service (MBMS) notification information in a Long Term Evolution (LTE) system.

BACKGROUND OF THE RELATED ART

With the rapid development of Internet and the popularity of large-screen multifunctional mobile phones, there appeared a large number of mobile data and multimedia services and a variety of high bandwidth multimedia services, such as video conference, TV broadcast, video on demand, advertisements, online education and interactive games, etc., which not only meet the growing service requirements of mobile users, but also bring a new service growth point to mobile operators. These mobile data and multimedia services demand multiple users receive same data simultaneously, and have characteristics such as large data quantity, long duration, and sensitive latency, etc., compared with common data services.

In order to use mobile network resources effectively, the 3rd Generation Partnership Project (3GPP) proposes a MBMS service, which is a technology of transmitting data from one data source to multiple targets, to achieve share of network (including core network and access network) resources and improve the utilization of the network resources (especially air interface resources). The MBMS defined by 3GPP can not only implement plain text, low-rate message type multicast and broadcast, but also implement high-speed multimedia service broadcast and multicast, to provide a variety of abundant video, audio and multimedia services, which undoubtedly conforms to the trend of the development of future mobile data and provides better business prospects for the development of 3G.

The characteristics of MBMS are large service data quantity, long duration when a terminal receives data, and constant average data rate. The above characteristics determine that both scheduling of MBMS services and control signaling configuration are semi-statically configured, i.e., both scheduling information of the MBMS services and MCCH information remain unchanged for a long time, and thus a network side transmits the unchanged MCCH information as a transmission period of MCCH information arrives. However, the MCCH information is transmitted continuously, because there may be access of a new user at any time. At present, in order to assist the terminal in saving power when receiving the MCCH information, periodic transmission of the MCCH information is proposed. Particularly, the MCCH information has repetition periods and modification periods. A modification period generally is an integral multiple of the repetition period, and one modification period contains a plurality of repetition periods. As each repetition period in the modification period arrives, the network side transmits the MCCH information once. The MCCH information transmitted each time is same, and updated MCCH information is allowed to be transmitted only when the modification period arrives. Thus, the number of times that the terminal receives the MCCH information can be reduced to implement power saving to some extent.

On the other hand, some companies hope to assist the terminal in avoiding receiving the MCCH information which is not updated by introducing a MBMS notification mechanism. The MBMS notification mechanism can also implement the function of the modification period of the MCCH information, and even does better than the modification period does. For example, it allows the MCCH information to be modified more flexibly without bringing receiving delay of the terminal and delay of service scheduling. However, considering the process and time of the R9 protocol, and because there has been no perfect notification mechanism yet at present in the LTE R9 protocol, the MBMS notification mechanism has not been determined to be used in the R9 protocol at present. Some companies believe that the MBMS notification mechanism can be introduced in later versions.

At present, the MBMS notification information may also be referred to as a MBMS notification message, and accordingly, a MCCH information update indication mechanism may also be referred to as a MBMS notification mechanism. The present invention will be described using the MBMS notification information and the MBMS notification mechanism.

SUMMARY OF THE INVENTION

In view of this, a main object of the present invention is to provide a method and device for carrying MBMS notification information so as to accurately notify whether MCCH information is updated as a modification period of the MCCH information arrived such that a receiving terminal can determine whether to receive the current MCCH information.

In order to achieve the above object, the technical scheme of the present invention is implemented as follows.

The present invention provides a method for carrying MBMS notification information comprising:

when the MBMS notification information is transmitted more than once in a modification period of MCCH information, carrying at least once the MBMS notification information in a sub-frame carrying the MCCH information at the time of arrival of the modification period of the MCCH information; and when the MBMS notification information is transmitted once in the modification period of the MCCH information, carrying the MBMS notification information in the sub-frame carrying the MCCH information at the time of arrival of the modification period of the MCCH information.

Preferably, the sub-frame carrying the MCCH information at the time of arrival of the modification period of the MCCH information is the first multicast sub-frame carrying the MCCH information before the modification period of the MCCH information arrives, or a sub-frame carrying the MCCH information as the modification period of the MCCH information arrives.

Preferably, the carrying the MBMS notification information in the sub-frame comprising carrying the MBMS notification information in the first sub-frame when there is more than one sub-frame carrying the MCCH information, and carrying the MBMS notification information in the sub-frame carrying the MCCH information when there is one sub-frame carrying the MCCH information.

Preferably, the MBMS notification information is carried in a control field of the sub-frame; and the control field is a resource carrying a Physical Downlink Control Channel (PD-CCH) in the sub-frame.

Preferably, the MBMS notification information is control information containing an appointed Radio Network Temporary Identifier (RNTI), or control information containing a P-RNTI, SI-RNTI or RA-RNTI, or a dedicated MCCH information update indication bit.

Preferably, the control information containing the P-RNTI, SI-RNTI, RA-RNTI or appointed RNTI means that:

Cyclic Redundancy Check (CRC) bits of the original information in the control information is scrambled with the P-RNTI, SI-RNTI, RA-RNTI or appointed RNTI, and the P-RNTI, SI-RNTI, RA-RNTI or appointed RNTI are implied in the CRC of the control information.

Preferably, the method further comprises:

when there is more one sub-frame carrying the MCCH information at the time of arrival of the modification period of the MCCH information, carrying the MBMS information in control fields of all sub-frames carrying the MCCH information.

Preferably, the sub-frame includes a MBSFN sub-frame or a Non-MBSFN sub-frame. The present invention provides a device for carrying MBMS notification information comprising:

a first carrying unit configured to, when the MBMS notification information is transmitted more than once in a modification period of MCCH information, carry at least once the MBMS notification information in a sub-frame carrying the MCCH information at the time of arrival of the modification period of the MCCH information; and when the MBMS notification information is transmitted once in the modification period of the MCCH information, carry the MBMS notification information in the sub-frame carrying the MCCH information at the time of arrival of the modification period of the MCCH information.

Preferably, the sub-frame carrying the MCCH information at the time of arrival of the modification period of the MCCH information is the first multicast sub-frame carrying the MCCH information before the modification period of the MCCH information arrives, or a sub-frame carrying the MCCH information as the modification period of the MCCH information arrives.

Preferably, the carrying the MBMS notification information in the sub-frame comprising carrying the MBMS notification information in the first sub-frame when there is more one sub-frame carrying the MCCH information; and carrying the MBMS notification information in the sub-frame carrying the MCCH information when there is one sub-frame carrying the MCCH information.

Preferably, the first carrying unit further carries the MBMS notification information in a control field of the sub-frame, the control field being a resource carrying a Physical Downlink Control Channel (PDCCH) in the sub-frame.

Preferably, the MBMS notification information is control information containing an appointed Radio Network Temporary Identifier (RNTI), or control information containing a P-RNTI, SI-RNTI or RA-RNTI, or a dedicated MCCH information update indication bit.

Preferably, the control information containing the P-RNTI, SI-RNTI, RA-RNTI or appointed RNTI means that:

Cyclic Redundancy Check (CRC) bits of the original information in the control information is scrambled with the P-RNTI, SI-RNTI, RA-RNTI or appointed RNTI, and the P-RNTI, SI-RNTI, RA-RNTI or appointed RNTI are implied in the CRC of the control information.

Preferably, the device further comprises a determination unit and a second carrying unit, wherein the determination unit is configured to determine whether there is more than one sub-frame carrying the MCCH information, and if yes, trigger the second carrying unit; and the second carrying unit is configured to carry the MBMS notification information in control fields of all sub-frames carrying the MCCH information.

As the modification period of the MCCH information arrives, the MBMS notification information is carried in a control field of the first sub-frame carrying the MCCH information to indicate whether the MCCH information is updated. If the MCCH information is updated, a receiving terminal will monitor the MCCH information carried in the sub-frame; otherwise, the receiving terminal is not required to monitor the MCCH information in the sub-frame. Since the update of the MCCH information is relatively slow, there is often the case that the MCCH information is not updated as the modification period arrives. The receiving terminal can determine whether to monitor the MCCH information by only monitoring the MBMS notification information in the control field of the sub-frame at the time of arrival of the modification period. Therefore, the receiving terminal will save more power.

PREFERRED EMBODIMENTS OF THE PRESENT INVENTION

Figure 1:
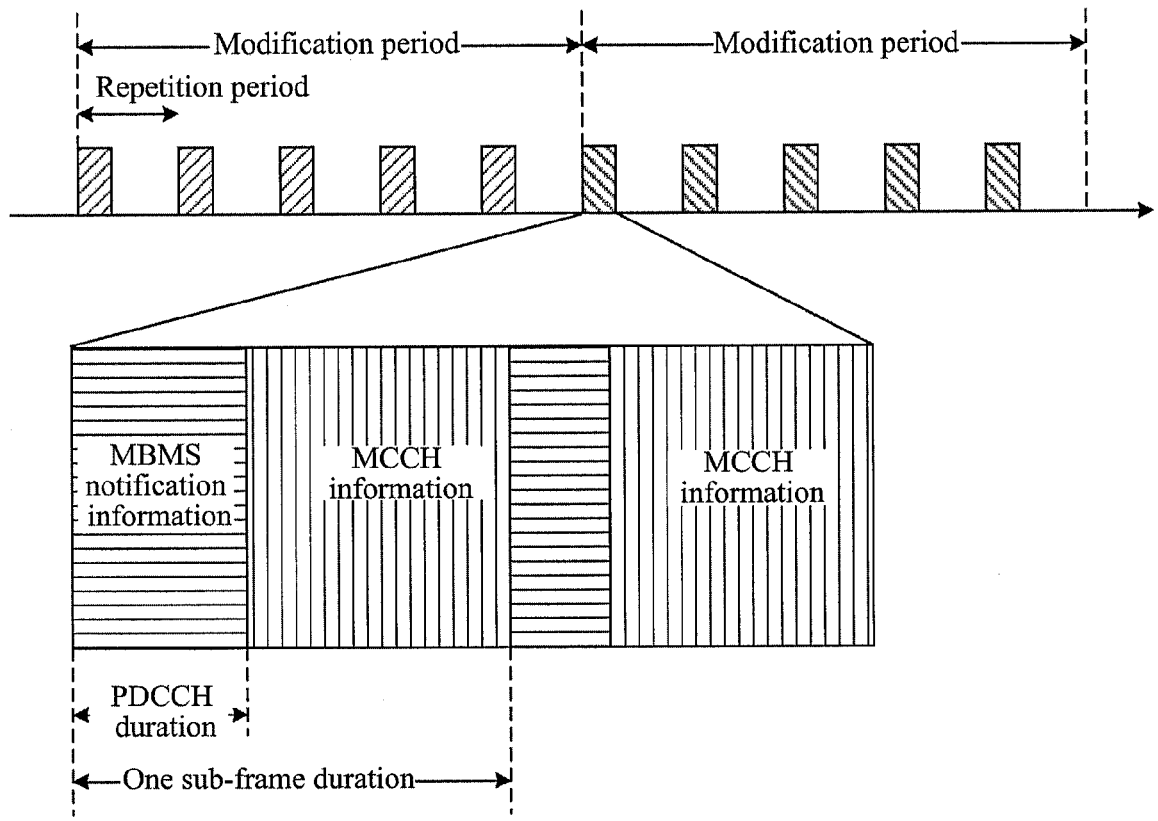
FIG. 1 is a schematic diagram of MBMS notification information carried in a sub-frame according to the present invention.

The basic idea of the present invention is that as a modification period of MCCH information arrives, MBMS notification information is carried in a control field of the first sub-frame carrying MCCH information to indicate whether the MCCH information is updated. If the MCCH information is updated, a receiving terminal will monitor the MCCH information carried in the sub-frame; otherwise, the receiving terminal is not required to monitor the MCCH information in the sub-frame. Since the update of the MCCH information is relatively slow, there is often the case that the MCCH information is not updated as the modification period arrives. The receiving terminal can determine whether to monitor the MCCH information by only monitoring the MBMS notification information in the control field of the sub-frame at the time of arrival of the modification period. Therefore, the receiving terminal will save more power.

In order to understand the objects, technical schemes and advantages of the present invention more clearly, the present invention will be further described in detail by way of example and with reference to accompanying drawings.

In the present invention, the concepts of Multicast/Broadcast Single Frequency Network (MBSFN) sub-frames and Unicast sub-frames in the LTE system are defined as follows: sub-frames configured with respect to information of MBSFN-SubFrameConfiguration in a system information block (SIB) 2 are referred to as MBSFN sub-frames, the main effect of which is to transmit MBMS services. These sub-frames use extended cyclic prefix, wherein the first one or two Orthogonal Frequency Division Multiplexing (OFDM) symbols are used as PDCCHs, and serve Unicast services. Non-MBSFN sub-frames, which are sub-frames other than the above sub-frames, can use standard Circle Prefix (CP) or the extended cyclic prefix. Typically, the first one to four OFDM symbols are used as PDCCHs.

Carrying control information containing a certain Radio Network Temporary Identifier (RNTI) in the PDCCH specifically is similar to carrying control information of each user in the PDCCH in the LTE system. There is a simple implicit relationship between the RNTI and a Cyclic Redundancy Check (CRC) code, i.e., the RNTI is scrambled on the CRC, referring to the related description in section 5.3.3.2 of LTE protocol 36.212_870.

In the LTE system, Paging PNTI (P-RNTI), System Information RNTI (SI-RNTI) and Random Access RNTI (RA-RNTI), which are three fixed RNTIs, are used to assist the receiving terminal in discovering control information of a paging message, control information of a system message and control information of a random access message in the PDCCH respectively, referring to the related description in LTE protocol 36.321_850.

In addition, at present, appellations of update indication information of the MCCH information have not been unified. Although some companies called it as MBMS notification indication, and other companies called it as MCCH notification indication, both purposes are to indicate whether the MCCH information is updated when comparing with the MCCH information transmitted as the last modification is allowed. The update indication information of the MCCH information in the present invention is a MBMS notification indication or a MCCH notification indication.

Embodiment One

The technical scheme described in the present embodiment is that when MCCH information is only carried in one sub-frame, control information containing a RNTI which is appointed by a receiving terminal beforehand is carried in a PDCCH of a sub-frame to which the time of arrival of a modification period of the MCCH information corresponds. In the present invention, the MCCH information is MBMS control information carried in the MCCH. The MBMS control information is used to indicate time-frequency resource information carrying the MBMS such that the receiving terminal can accurately monitor the MBMS in a service channel.

For easy of description, suppose that the RNTI appointed beforehand by the receiving terminal is denoted as an M-RNTI.

Assuming that when the receiving terminal detects control information containing the M-RNTI on the PDCCH of the sub-frame carrying the MCCH information, it is shown that update occurs in the subsequent MCCH information which will be transmitted or has been transmitted; otherwise, it is shown that update does not occur in the subsequent MCCH information. This is beneficial to receive and analyze the MCCH information even when the receiving terminal does not detect the control information, ensuring normal operation of a system. Here, the control information containing the M-RNTI is used as MBMS notification information, i.e., it is determined whether the MCCH information is updated based on whether the control information carried in the sub-frame contains the M-RNTI. Because the above described M-RNTI is appointed by the system and the receiving terminal beforehand, the receiving terminal can determine whether the MCCH information is updated by monitoring whether the control information in a control field in the sub-frame contains the M-RNTI.

The control information containing a P-RNTI, SI-RNTI, RA-RNTI or appointed RNTI means that Cyclic Redundancy Check (CRC) bits of the original information A (the original information A may be any information temporarily generated by the system, and should be small in order to reduce transmission amount) is scrambled with the P-RNTI, SI-RNTI, RA-RNTI or appointed RNTI and the P-RNTI, SI-RNTI, RA-RNTI or appointed RNTI are implied in the CRC of the control information (information A, which may be invalid information or meaningless information). For the scrambling processing, referring to the related description in section 5.3.3.2 of LTE protocol 36.212_870. As the modification period of the MCCH information arrives, if the MCCH information is not updated, the CRC bits in the MBMS notification information will be scrambled with the M-RNTI, and then the obtained data is transmitted in the PDCCH after operations specified in the protocols, such as channel encoding; otherwise, the CRC of the MBMS notification information in the sub-frame to which the time of arrival of the modification period of the MCCH information corresponds is scrambled with other RNTIs or is not scrambled, or the MBMS notification information containing the M-RNTI is not transmitted in the sub-frame to which the time of arrival of the modification period of the MCCH information corresponds.

If the MCCH information needs to be updated in the next modification period, as the modification period of the MCCH information arrives, the updated MCCH information is carried in a data field in the sub-frame to which the time of arrival of the modification period of the MCCH information corresponds, and at the same time, the MBMS notification information containing the M-RNTI is not transmitted in a control field, i.e., the PDCCH, in the sub-frame carrying the MCCH information.

If the MCCH information is not updated in the next modification period, as the modification period of the MCCH information arrives, the original MCCH information is transmitted in the sub-frame (the data field of the sub-frame) to which the time of arrival of the modification period of the MCCH information corresponds (at this point primarily, in order to ensure the receiving terminal just accessed can receive the MCCH information), and at the same time, the MBMS notification information containing the M-RNTI is carried in the sub-frame (the control field, i.e., the PDCCH, of the sub-frame) carrying the MCCH information. FIG. 1 is a schematic diagram of MBMS notification information carried in a sub-frame. As shown in FIG. 1, the MBMS notification information is carried in the control field in the first sub-frame in the next modification period as the modification period of the MCCH information arrives.

Or, if the MCCH information needs not to be updated in the next modification period, as the modification period of the MCCH information arrives, the MCCH information is not transmitted in the sub-frame (the data field of the sub-frame) to which the time of arrival of the modification period of the MCCH information corresponds, and at the same time, the MBMS notification information containing the M-RNTI is transmitted in the sub-frame (the control field of the sub-frame) carrying the MCCH information.

In the present embodiment, when the receiving terminal detects information containing the M-RNTI on the PDCCH of the sub-frame carrying the MCCH information, it is also shown that the subsequent MCCH information that will be transmitted or has been transmitted is updated; otherwise, it is shown that the subsequent MCCH information is not updated. The implementation procedure is the same as the method described above.

When the MCCH information in the system is only transmitted periodically and update is allowed to occur in each period, a carrying mechanism of update indication information (MBMS notification information) of the MCCH information in embodiment one can be directly applied to each transmission period of the MCCH information, i.e., the MBMS notification information containing the appointed RNTI is transmitted or is not transmitted in the sub-frame carrying the MCCH information in each period, to indicate whether the subsequent MCCH information is updated.

In the present embodiment, a dedicated indication bit can be set in the control field of the sub-frame carrying the MCCH information as MBMS notification information. For example, one indication bit is set to indicate whether the MCCH information is changed. When the indication bit is "0", the MCCH information is not changed in the modification period, and when the indication bit is "1", the MCCH information is changed in the modification period, which will be described in detail hereinafter.

A bit is set for the MBMS notification information, and when the bit is 1, it is indicated that the MCCH information is updated; and when the bit is 0, it is indicated that the MCCH information is not updated. Then, the 1 bit information and other MBMS notification information are added to CRC bits, and the CRC bits are then scrambled with an appointed M-RNTI. Thus, the finally obtained data is transmitted on the PDCCH of the sub-frame after operations specified in the protocols, such as channel encoding. The sub-frame is a sub-frame carrying the MCCH information at the time of arrival of the modification period of the MCCH information. When there is more than one sub-frame, the encoded MBMS notification information is transmitted on the PDCCH of the first sub-frame, or the MBMS notification information is transmitted on the PDCCH of each sub-frame; and when there is one sub-frame, the MBMS notification information is transmitted on the PDCCH of the sub-frame.

The sub-frame carrying the MCCH information at the time of arrival of the modification period of the MCCH information is the first multicast sub-frame carrying the MCCH information before a radio frame of the modification period of the MCCH information arrives, or is the first sub-frame carrying the MCCH information in the radio frame in which the modification period of the MCCH information is located.

The receiving terminal searches the MBMS notification information containing the M-RNTI on the PDCCH of the sub-frame carrying the MCCH information at the time of arrival of the modification period of the MCCH information, and then analyzes the MBMS notification information to determine whether the MCCH information which has been transmitted or will be transmitted is updated based on whether the set bit is 0 or 1 at this point.

In the present embodiment, the sub-frame is a MBSFN sub-frame or a Non-MBSFN sub-frame.

Embodiment Two

The technical scheme described in the present embodiment is that when MCCH information is carried in two or more sub-frames, control information containing a RNTI which is appointed by a receiving terminal beforehand is carried in the PDCCH of the first sub-frame to which the time of arrival of the modification period of the MCCH information corresponds.

For easy of description, suppose that the RNTI appointed beforehand by the receiving terminal is denoted as an M-RNTI.

Assuming that when the receiving terminal detects control information containing the M-RNTI on the PDCCH of the sub-frame carrying the MCCH information, it is shown that update occurs in the subsequent MCCH information which will be transmitted or has been transmitted; otherwise, it is shown that update does not occur in the subsequent MCCH information. This is beneficial to receive and analyze the MCCH information even when the receiving terminal does not detect the control information, ensuring normal operation of a system.

The control information containing a P-RNTI, SI-RNTI, RA-RNTI or appointed RNTI means that Cyclic Redundancy Check (CRC) bits of the original information (which is information A in embodiment one, may be small set information, meaningless information or invalid information) in the control information is scrambled with the P-RNTI, SI-RNTI, RA-RNTI or appointed RNTI, and the P-RNTI, SI-RNTI, RA-RNTI or appointed RNTI are implied in the CRC of the control information. The scrambling processing will be described as follows: the CRC bits of the original information in the control information is scrambled with the P-RNTI, SI-RNTI RA-RNTI or appointed RNTI so as to imply the P-RNTI, SI-RNTI, RA-RNTI or appointed RNTI in the CRC of the control information. For the scrambling processing, referring to the related description in section 5.3.3.2 of LTE protocol 36.212_870. As the modification period of the MCCH information arrives, if the MCCH information is not updated, the CRC bits in the MBMS notification information will be scrambled with the M-RNTI, and then the obtained data is transmitted on the PDCCH after operations specified in the protocols, such as channel encoding; otherwise, the CRC of the MBMS notification information in the sub-frame to which the time of arrival of the modification period of the MCCH information corresponds is scrambled with other RNTIs or is not scrambled, or the MBMS notification information containing the M-RNTI is not transmitted in the sub-frame to which the time of arrival of the modification period of the MCCH information corresponds.

If the MCCH information needs to be updated in the next modification period, as the modification period of the MCCH information arrives, the updated MCCH information is carried in the sub-frame to which the time of arrival of the modification period of the MCCH information corresponds, and at the same time, the control information containing the M-RNTI is not transmitted in the first sub-frame (in a control field, i.e., the PDCCH, of the sub-frame) carrying the MCCH information.

If the MCCH information needs not to be updated in the next modification period, as the modification period of the MCCH information arrives, the original MCCH information is transmitted in the sub-frame to which the time of arrival of the modification period of the MCCH information corresponds, and at the same time, the control information containing the M-RNTI is transmitted in the first sub-frame carrying the MCCH information.

Or, if the MCCH information needs not to be updated in the next modification period, as the modification period of the MCCH information arrives, the MCCH information is not transmitted in the sub-frame to which the time of arrival of the modification period of the MCCH information corresponds, and at the same time, the control information containing the M-RNTI is transmitted in the first sub-frame carrying the MCCH information.

In the present embodiment, when the receiving terminal detects information containing the M-RNTI on the PDCCH of the sub-frame carrying the MCCH information, it is also shown that the subsequent MCCH information that will be transmitted or has been transmitted is updated; otherwise, it is shown that the subsequent MCCH information is not updated. The processes described above are required to be exchanged accordingly only.

In the present embodiment, a dedicated indication bit can be set in the control field of the sub-frame carrying the MCCH information as MBMS notification information. For example, one indication bit is set to indicate whether the MCCH information is changed. When the indication bit is "0", the MCCH information is not changed in the modification period, and when the indication bit is "1", the MCCH information is changed in the modification period. The carrying mode subsequent to setting of the dedicated indication bit is the same as that in embodiment one and will not be described in detail herein.

In the present embodiment, when the MCCH information in the system is only transmitted periodically and update is allowed to occur in each period, a carrying mechanism of update indication information of the MCCH information in embodiment two can be directly applied to each transmission period of the MCCH information, i.e., the control information containing the appointed RNTI is transmitted or is not transmitted in the sub-frame carrying the MCCH information in each period, to indicate whether the subsequent MCCH information is updated.

It should be noted that in the present embodiment, as the modification period of the MCCH information arrives, the update indication information of the MCCH information can be also carried in a control field of each sub-frame carrying the MCCH information, i.e., the control information containing the M-RNTI or the control information not containing the M-RNTI is carried. Or, the indication bit of the update information of the MCCH information is carried in the control field of each sub-frame carrying the MCCH information.

In the present embodiment, the sub-frame is a MBSFN sub-frame or a Non-MBSFN sub-frame.

Embodiment Three

The technical scheme described in the present embodiment is that control information containing a RNTI which is appointed by a receiving terminal beforehand is carried in a PDCCH of a sub-frame to which the time of arrival of a modification period of MCCH information corresponds. The RNRI here may be any one of a P-RNTI, SI-RNTI and RA-RNTI.

In order to give an application example for the current LTE system, this scheme needs not to additionally define the appointed RNTI, and is implemented by using a common RNTI existing in the LTE system. At present, in the LTE, it is specified that the MCCH information is carried in a MBSFN sub-frame. According to the provisions of the existing protocols, the P-RNTI, SI-RNTI and RA-RNTI described above will not be present in the PDCCH of the MBSFN sub-frame. Therefore, a new meaning can be expressed just by combining these particular RNTIs with the MBSFN sub-frame to indicate whether the MCCH information is updated.

The specific operations are the same as those in embodiment one and embodiment two, except that the M-RNTI is replaced with one of the P-RNTI, SI-RNTI and RA-RNTI, but which one is used depends on beforehand appointment of the terminal.

In all the embodiments described above, when the MBMS notification information is transmitted in the modification period of the MCCH information many times, the MBMS notification information is carried at least once in the control field of the sub-frame carrying the MCCH information at the time of arrival of the modification period of the MCCH information. The sub-frame carrying the MCCH information at the time of arrival of the modification period of the MCCH information is the first multicast sub-frame carrying the MCCH information before a radio frame of the modification period of the MCCH information arrives, or is the first sub-frame carrying the MCCH information in the radio frame in which the modification period of the MCCH information is located.

Figure 2:
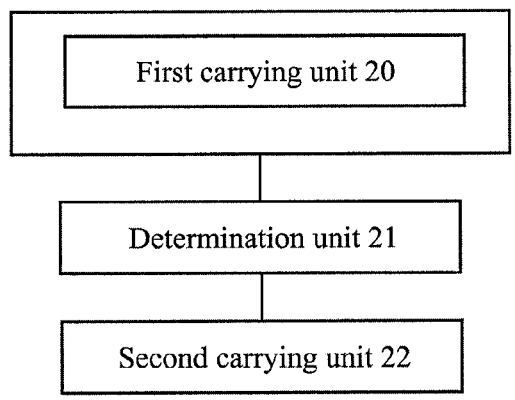
FIG. 2 is a block diagram of a device for carrying MBMS notification information according to the present invention.

FIG. 2 is a block diagram of a device for carrying MBMS notification information according to the present invention. As shown in FIG. 2, the device for carrying MBMS notification information according to the present invention comprises a first carrying unit 20, a determination unit 21 and a second carrying unit 22. The first carrying unit 20 is configured to, when the MBMS notification information is transmitted more than once in a modification period of MCCH information, carry at least once the MBMS notification information in a control field of a sub-frame carrying the MCCH information at the time of arrival of the modification period of the MCCH information; or when the MBMS notification information is transmitted once in the modification period of the MCCH information, carry the MBMS notification information in the control field of the sub-frame carrying the MCCH information at the time of arrival of the modification period of the MCCH information. The sub-frame carrying the MCCH information at the time of arrival of the modification period of the MCCH information is the first multicast sub-frame carrying the MCCH information before the radio frame of the modification period of the MCCH information arrives, or the first sub-frame carrying the MCCH information in the radio frame in which the modification period of the MCCH information is located. The carrying the MBMS notification information in the sub-frame comprising carrying the MBMS notification information in the first sub-frame when there is more one sub-frame carrying the MCCH information; and carrying the MBMS notification information in the sub-frame carrying the MCCH information when there is one sub-frame carrying the MCCH information. The MBMS notification information is carried in a control field of the sub-frame; and the control field is a resource carrying a PDCCH in the sub-frame. The MBMS notification information is control information containing an appointed RNTI, or control information containing a P-RNTI, SI-RNTI or RA-RNTI, or a dedicated MCCH information update indication bit. The control information containing the P-RNTI, SI-RNTI, RA-RNTI or appointed RNTI means that Cyclic Redundancy Check (CRC) bits of the original information in the control information is scrambled with the P-RNTI, SI-RNTI, RA-RNTI or appointed RNTI, and the P-RNTI, SI-RNTI, RA-RNTI or appointed RNTI are implied in the CRC of the control information. The determination unit 21 is configured to determine whether there is more than one sub-frame carrying the MCCH information, and if yes, trigger the second carrying unit. The second carrying unit 22 is configured to carry the MBMS notification information in control fields of all sub-frames carrying the MCCH information.

It is should be understood by those skilled in the art that implementation functions of each processing unit in the device for carrying the MBMS notification information illustrated in FIG. 2 can be understood with reference to related description in embodiments one to three. The determination unit 21 and the second carrying unit 22 are not essential technical features for implementing the device according to the present invention, and are only configured for optimizing the device illustrated in FIG. 2. The functions of each processing unit in the device for carrying the MBMS notification information illustrated in FIG. 2 can be implemented by programs running on a processor or by specific logic circuits.

The above description is only the preferred embodiments of the present invention and is not intended to limit the protection scope of the present invention.

What is claimed is:

1. A method for carrying Multimedia Broadcast Multicast Service (MBMS) notification information, comprising:

when the MBMS notification information is transmitted more than once in a modification period of Multicast Control Channel (MCCH) information, carrying at least once the MBMS notification information in a control field of a sub-frame carrying the MCCH information at the time of arrival of the modification period of the MCCH information, wherein the control field is a resource carrying a Physical Downlink Control Channel (PDCCH) in the sub-frame; and when the MBMS notification information is transmitted once in the modification period of the MCCH information, carrying the MBMS notification information in the control field of the sub-frame carrying the MCCH information at the time of arrival of the modification period of the MCCH information;

wherein the MBMS notification information is used to indicate whether the MCCH information is updated compared with the MCCH information transmitted in the last modification period of the MCCH information;

wherein the carrying the MBMS notification information in the sub-frame comprising: carrying the MBMS notification information in the first sub-frame when there is more than one sub-frame carrying the MCCH information at the time of arrival of the modification period of the MCCH information, and carrying the MBMS notification information in the sub-frame carrying the MCCH information when there is one sub-frame carrying the MCCH information at the time of arrival of the modification period of the MCCH information.

2. The method according to claim 1, wherein the time of arrival of the modification period of the MCCH information means an upcoming Modification period of the MCCH information indicated by the MBMS notification information.

3. The method according to claim 2, wherein the sub-frame includes a Multicast/Broadcast Single Frequency Network (MBSFN) sub-frame or a Non-MBSFN sub-frame.

4. The method according to claim 1, wherein the sub-frame carrying the MCCH information at the time of arrival of the modification period of the MCCH information is the first multicast sub-frame carrying the MCCH information before the modification period of the MCCH information arrives, or a sub-frame carrying the MCCH information as the modification period of the MCCH information arrives.

5. The method according to claim 4, wherein the MBMS notification information is carried in a control field of the sub-frame; and the control field is a resource carrying a Physical Downlink Control Channel (PDCCH) in the sub-frame.

6. The method according to claim 1, wherein the MBMS notification information is control information containing an appointed Radio Network Temporary Identifier (RNTI), or control information containing a Paging RNTI (P-RNTI), System Information (SI-RNTI) or Random Access (RA-RNTI), or a dedicated MCCH information update indication bit.

7. The method according to claim 6, wherein the control information containing the P-RNTI, SI-RNTI, RA-RNTI or appointed RNTI means that:

Cyclic Redundancy Check (CRC) bits of the original information in the control information is scrambled with the P-RNTI, SI-RNTI, RA-RNTI or appointed RNTI, and the P-RNTI, SI-RNTI, RA-RNTI or appointed RNTI are implied in the CRC of the control information.

8. The method according to claim 1, further comprising: when there is more one sub-frame carrying the MCCH information at the time of arrival of the modification period of the MCCH information, carrying the MBMS notification in control fields of all sub-frames carrying the MCCH information.

9. The method according to claim 1, wherein the sub-frame includes a Multicast/Broadcast Single Frequency Network (MBSFN) sub-frame or a Non-MBSFN sub-frame.

10. The method according to claim 1, wherein the MBMS notification information is carried in a control field of the sub-frame; and the control field is a resource carrying a Physical Downlink Control Channel (PDCCH) in the sub-frame.

11. A device for carrying Multimedia Broadcast Multicast Service (MBMS) notification information comprising:

a first carrying unit configured to, when the MBMS notification information is transmitted more than once in a modification period of Multicast Control Channel (MCCH) information, carry at least once the MBMS notification information in a control field of a sub-frame carrying the MCCH information at the time of arrival of the modification period of the MCCH information, the control field being a resource carrying a Physical Downlink Control Channel (PDCCH) in the sub-frame; and when the MBMS notification information is transmitted once in the modification period of the MCCH information, carry the MBMS notification information in the control field of the sub-frame carrying the MCCH information at the time of arrival of the modification period of the MCCH information;

wherein the MBMS notification information is used to indicate whether the MCCH information is updated compared with the MCCH information transmitted in the last modification period of the MCCH information;

the device further comprises a determination unit and a second carrying unit, wherein the determination unit is configured to determine whether there is more than one sub-frame carrying the MCCH information, and if yes, trigger the second carrying unit; and the second carrying unit is configured to carry the MBMS notification information in control fields of all sub-frames carrying the MCCH information;

wherein the first carrying unit is configured to carry the MBMS notification information in the sub-frame by: carrying the MBMS notification information in the first sub-frame when there is more than one sub-frame carrying the MCCH information at the time of arrival of the modification period of the MCCH information; and carrying the MBMS notification information in the sub-frame carrying the MCCH information when there is one sub-frame carrying the MCCH information at the time of arrival of the modification period of the MCCH information.

12. The device according to claim 11, wherein the sub-frame carrying the MCCH information at the time of arrival of the modification period of the MCCH information is the first multicast sub-frame carrying the MCCH information before the modification period of the MCCH information arrives, or a sub-frame carrying the MCCH information as the modification period of the MCCH information arrives.

13. The device according to claim 11, wherein the MBMS notification information is control information containing an appointed Radio Network Temporary Identifier (RNTI), or control information containing a Paging RNTI (P-RNTI), System Information (SI-RNTI) or Random Access (RA-RNTI), or a dedicated MCCH information update indication bit.

14. The device according to claim 13, wherein the control information containing the P-RNTI, SI-RNTI, RA-RNTI or appointed RNTI means that:

Cyclic Redundancy Check (CRC) bits of the original information in the control information is scrambled with the P-RNTI, SI-RNTI, RA-RNTI or appointed RNTI, and the P-RNTI, SI-RNTI, RA-RNTI or appointed RNTI are implied in the CRC of the control information.

\* \* \* \* \*